United States Patent [19]
Spencer

[11] Patent Number: 6,036,853
[45] Date of Patent: Mar. 14, 2000

[54] ARTICULATED FILTER CORE ELEMENT

[75] Inventor: Terrel F. Spencer, Lake Geneva, Wis.

[73] Assignee: Medtronic, Inc., Minneapolis, Minn.

[21] Appl. No.: 09/061,634

[22] Filed: Apr. 16, 1998

[51] Int. Cl.[7] .............................. E04H 4/16; F15D 55/00
[52] U.S. Cl. ...................... 210/169; 210/232; 210/315; 210/437; 210/489; 138/37; 138/39
[58] Field of Search .................. 210/169, 232, 210/314, 315, 317, 437, 440–442, 488, 489, 497.01; 138/37, 39; 248/94

[56] References Cited

U.S. PATENT DOCUMENTS

| | | |
|---|---|---|
| 828,715 | 8/1906 | Cook . |
| 1,642,864 | 9/1927 | Williams . |
| 3,272,342 | 9/1966 | McLaren et al. . |
| 3,715,036 | 2/1973 | Hamer . |
| 3,988,244 | 10/1976 | Brooks . |
| 4,014,796 | 3/1977 | Sugiyama et al. . |
| 4,317,727 | 3/1982 | Meissner . |
| 4,487,227 | 12/1984 | Meissner . |
| 4,507,200 | 3/1985 | Meissner . |
| 4,732,678 | 3/1988 | Humbert, Jr. . |
| 4,767,426 | 8/1988 | Daly et al. . |
| 5,104,534 | 4/1992 | Branchcomb . |
| 5,190,651 | 3/1993 | Spencer et al. . |
| 5,252,204 | 10/1993 | Chiodo . |
| 5,409,606 | 4/1995 | Spencer . |
| 5,482,622 | 1/1996 | Stark et al. . |
| 5,653,831 | 8/1997 | Spencer . |
| 5,656,159 | 8/1997 | Spencer et al. . |
| 5,928,588 | 7/1999 | Chen et al. . |

OTHER PUBLICATIONS

*Filtration News*, Jul./Aug. 1997 Issue, See advertisement located on the bottom of p. 63 regarding the NSW Corporation.
*Filtration News*, Jul./Aug. 1997 Issue, See advertisement located on p. 31 regarding the Filter–Mart Corporation.
*Filtration & Separation*, Dec. 1997, See advertisement located on p. 1025 regarding Sericol Limited.

*Primary Examiner*—David A. Simmons
*Assistant Examiner*—Fred Prince
*Attorney, Agent, or Firm*—Foley & Lardner

[57] ABSTRACT

A common filter assembly is formed from a filter membrane which is supported by a filter core element. The core element according to the invention is substantially planer in the as-molded condition but is adapted to be articulated into a cylindrical configuration. The core element comprises a framework adapted to control the flow of fluid therethrough to enhance the performance of the filter membrane.

23 Claims, 6 Drawing Sheets

ARTICULATED FILTER CORE ELEMENT

FIELD OF THE INVENTION

This invention relates generally to fluid filtration and, more particularly, to fluid filter cartridges and the core element used to support the filter membranes of the cartridge.

BACKGROUND OF THE INVENTION

Fluids such as water, oil, and the like are often "conditioned" by filtering the fluid to remove particulate matter. Typically, a filter housing supports a filter cartridge through which the fluid passes. The cartridge usually incorporates one or more filter membranes through which the fluid passes to remove the particulate. A typical construction for a filter cartridge comprises a core element which is adapted to support the filter membrane without obstructing the flow of fluid through the cartridge.

One common application of such fluid filter cartridges is in pool filter systems. In this such application, it is important to remove particulate contaminants in the water in order to keep the pool clean and to protect the mechanical elements of the pool system such as the heater and pump. A typical pool filter cartridge and filter housing are seen in U.S. Pat. No. 5,190,651 to Spencer et al. This filter system is formed from a quasi-cylindrical or egg-shaped filter housing and a cylindrical filter cartridge received therein. Although not expressly described in the Spencer patent, the cylindrical core of the filter cartridge is assembled from two, identical, hemicylindrical rigid core halves. The core halves incorporate interacting tabs and slots so that the rigid core halves can be snap-fit together to create a complete cylindrical filter core. A filter membrane is mounted on both the inside and outside of the filter core and held in place by upper and lower end caps. Generally, fluid passes through either the inner or outer membrane into the annular space defined by the filter core. The filtered water then flows through the interior of the filter cartridge for ultimate discharge from the filter housing.

The filter cartridge assembly as seen in the Spencer patent is effective for filtering the fluid. However, not unlike many manufactured articles, it can be manufactured more cost-effectively. First, the hemicylindrical rigid core halves are expensive to mold in that the costs for the detailed, hemicylindrical mold dies are extremely costly. This is due primarily to the depth of the hemicylindrical body and the detail of the resulting molded article. In addition, different mold halves must be formed for each particular size of the filter cartridge. In other words, for twenty-five and twenty-nine inch diameter filter cartridges filter housings will require two different sets of molds. While these filter cartridges are effective for filtering fluid, experimentation has shown that they can be relatively costly to manufacture as compared to invention.

SUMMARY OF THE INVENTION

The articulated core element according to the invention overcomes the problems of the prior art by creating a core element which can be manufactured more inexpensively as compared to the known cores and, is easily adaptable for a wide variety of differing non-planar configurations utilizing the same mold.

In one aspect, the invention relates to a fluid filter assembly which is adapted to be received in a fluid filter system. The filter assembly comprises at least one filter membrane adapted to permit the fluid therethrough and a filter core element adapted to support the filter membrane. The core element has a top and a bottom and opposed side edges and a flexible framework extending between these edges. A plurality of hinge elements are incorporated in the framework to accommodate manipulation of the framework between a substantially planar state and non-planar state. A plurality of fluid flowpaths are integrally formed within the framework of the core element to preferentially direct the flow of fluid therethrough.

In the preferred embodiment, multiple living hinges are incorporated into the filter membrane and means such as a cooperating barb and recess connectors are provided so that the flexible framework can be manipulated into a substantially cylindrical configuration. In addition, the flowpaths integrally formed into the framework are designed to direct a portion of the fluid passing through the filter membrane horizontally and another portion of the fluid is directed vertically.

In another embodiment, the fluid filter assembly includes a supplemental core element which structurally is very similar to the filter core element in that it incorporates a flexible framework, multiple hinges and multiple flowpaths integrally formed therein to direct the flow of fluid therethrough. The supplemental core element is adapted to be mounted intermediate to the side edges of the filter core element to create a large diameter filter core element.

The preferred embodiment of the fluid filter assembly is utilized in a pool water fluid filter system.

In another aspect, the invention is directed to a method of manufacturing a substantially non-planar fluid filter core element. The method comprises the steps of providing a substantially planar mold cavity, injecting molten thermoplastic material into the mold cavity, cooling the thermoplastic material and then removing the molded framework from the mold cavity. Preferably, the article molded within the mold cavity is the flexible framework core element as described above.

DESCRIPTION OF THE PREFERRED EMBODIMENT

Figure 1:
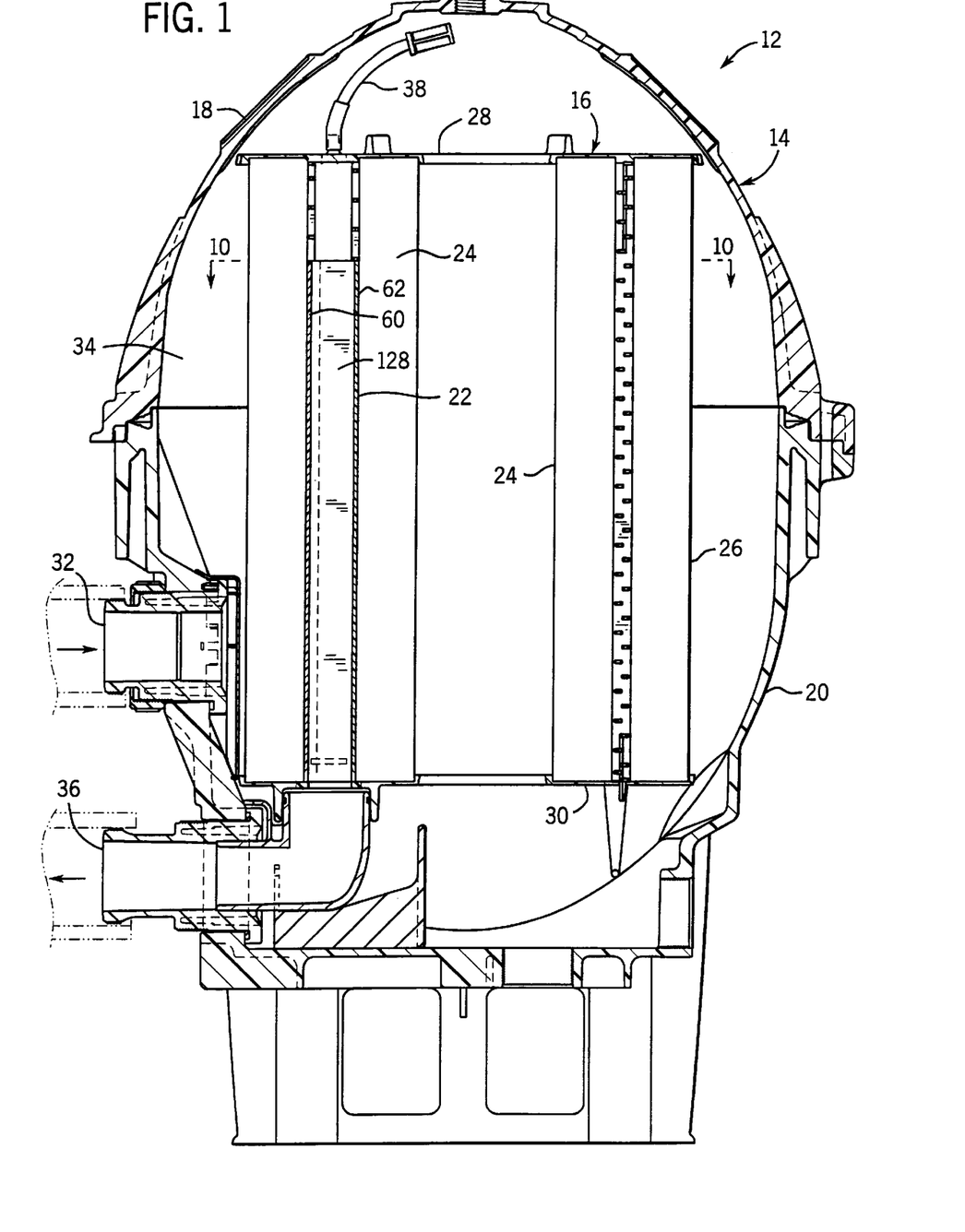
FIG. 1 is a sectional view of a fluid filter assembly incorporating an articulated filter core according to the invention.
Figure 10:
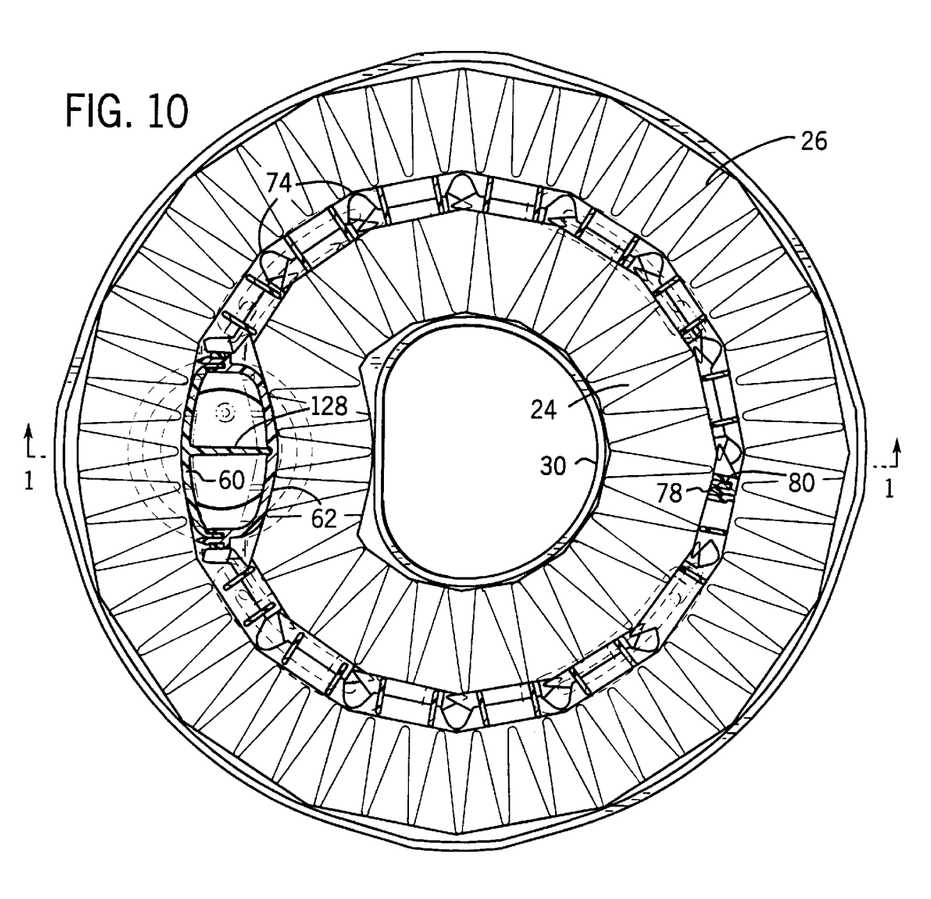
FIG. 10 is a cross-sectional view of the filter cartridge taken along lines 10—10 of FIG. 1.

Referring now to the drawings and to FIGS. 1 and 10, in particular, a filter assembly 12 is shown which comprises a filter housing 14 and a filter cartridge 16 received therein. The filter housing 14 is an assembly of a top half 18 and a bottom half 20 which are tightly secured to one another. The filter cartridge 16 comprises a core 22 adapted to support an inner filter membrane 24 and an outer filter membrane 26. The membranes and core 22 are held in a fixed relation to one another by a top cap 28 and bottom cap 30 which are adapted to hold all the elements in the particular relationship. A vent tube 38 is mounted to the top cap 28 and is fluidly connected to the annular space occupied by the core 22. During initial filling of the filter housing 14 with fluid, air within the annular space is vented through the vent tube 38 as the annular space fills with fluid.

Generally, unfiltered fluid enters the filter housing 14 through a fluid inlet 32 and flows into the hollow interior 34 of the filter housing 14. The fluid passes through one of the inner or outer filter membranes 24, 26 into the annular space defined by the core 22 as more fully described in U.S. Pat. No. 5,190,651 to Spencer et al., the disclosure of which is expressly incorporated by reference herein. The filtered water is collected at the base of the core 22 and is withdrawn therefrom through the fluid outlet 36. Generally, a pump is provided upstream from the fluid inlet 32 so that the fluid is pushed by the fluid force of pump into the fluid housing, through the filter membranes 24, 26 and out the fluid outlet 36.

Figure 2:
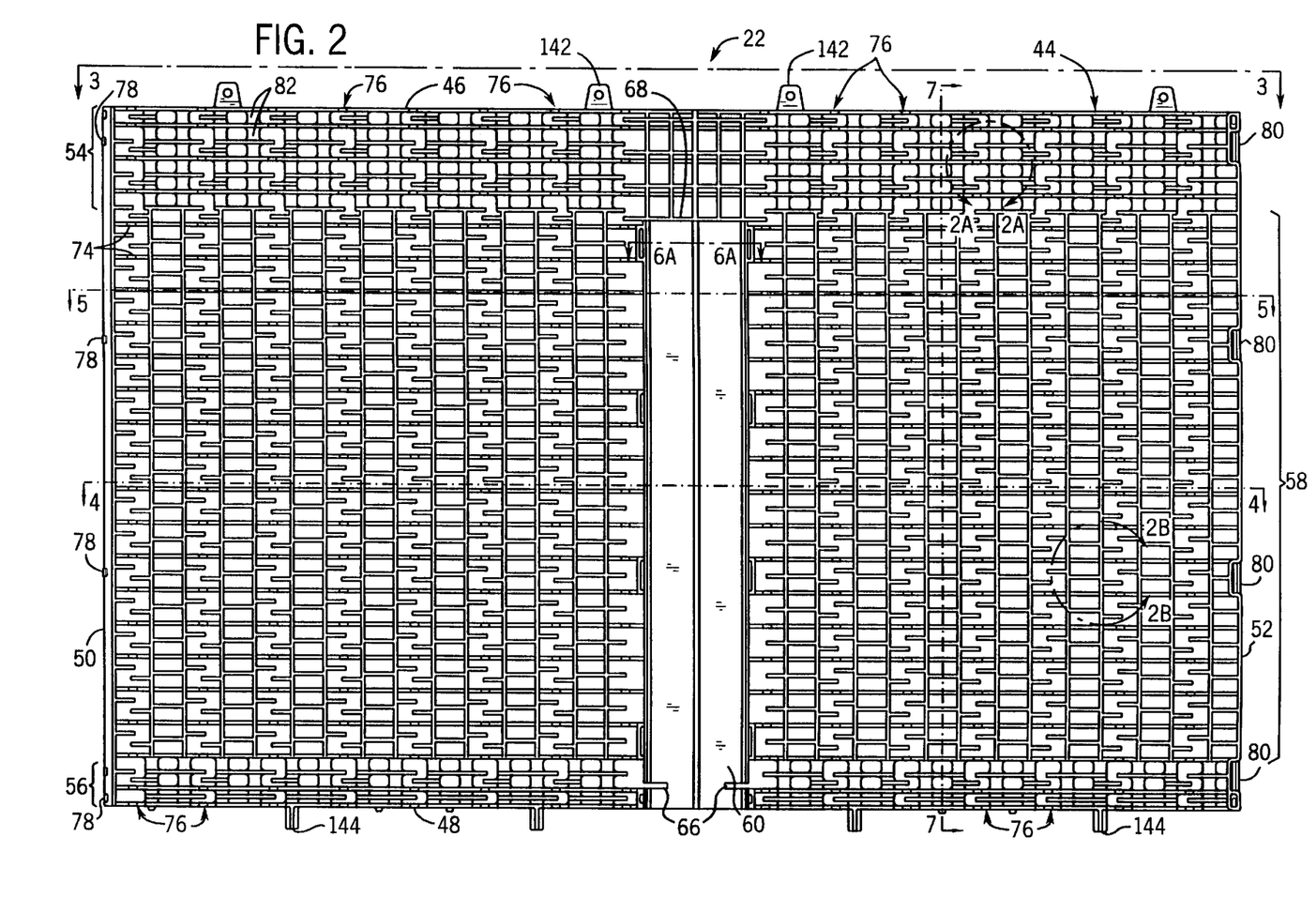
FIG. 2 is a front plan view of the main body portion of the articulated core in its planar state according to the invention.

As seen in FIG. 1, the core 22 is manipulated into a non-planar configuration for use in the filter housing. In the preferred embodiment, this non-planar configuration is cylindrical. However, as seen in FIG. 2, the core 22 is initially manufactured in a substantially planar configuration. In the preferred embodiment, the core 22 comprises a main body portion 44 having a top edge 46, bottom edge 48 and a pair of opposed side edges 50, 52. An interrupted grid or framework extends between the top, bottom, and side edges to create a flexible framework which can be articulated from its as-molded planar state to a non-planar configuration and also accommodate the movement of fluid therethrough. The molded framework is divided into several different regions all of which serve different functions. For example, adjacent to the top edge 46 and extending between the side edges 50, 52 is an upper horizontal flow portion 54. In this space, the framework is configured so that the primary path of least resistance for the movement of fluid through the framework is substantially horizontally, although limited vertical fluid flow is permitted. A bottom horizontal flow portion 56 is also provided in the core 22 and extends from the bottom edge 48 between the side edges 50, 52.

The vast majority of the framework of the filter core 22 comprises a vertical flow portion 58 which extends between the side edges 50, 52 and the top and bottom horizontal flow portions 54, 56. In this area, the fluid path of least resistance is vertically through the various elements of the core framework. Centrally located within the main body portion 44 of the core 22 is one-half of a tube riser 60. The riser 60 interrupts the bottom horizontal flow portion 56 and the vertical flow portion 58 but in the preferred embodiment does not extend so high as to interrupt the top horizontal flow portion 54. As seen in FIGS. 3, 6A, 6B and 10 and as described more fully below, a second half 62 of a tube riser is secured to the first half 60 to create a vertically oriented tube riser 64 through which filtered fluid can easily flow. The open bottom end of the assembled riser 64 is fluidly connected to the fluid outlet 36.

The particular structure of the core 22 can be better understood when the general fluid flow path through the core 22 is first understood. As noted above, fluid enters the filter housing 14 through the fluid inlet 32, is drawn through one of the filter membranes 24, 26, passes through the core 22 and is removed from the housing 14 through the fluid outlet 36. With this basic understanding of the fluid flow through the system, the particular fluid flow path through the core will now be described. Referring to FIGS. 1, 2 and 10, as fluid initially flows through the membranes 24, 26 it is received in the areas of the core 22. Water which enters the core in the area of the bottom horizontal flow portion 56 is easily drawn horizontally to the centrally located tube riser 64. However, relatively small fluid apertures 66 are provided in the base of the riser 64 so that only a limited amount of fluid present in the bottom horizontal flow portion 56 can enter the tube riser 64. The vast majority of the filtered water is drawn into the riser 64 through the open top 68 thereof. Water passing through one of the filter membranes 24, 26 in the area of vertical flow portion 58 will be drawn, primarily, vertically upwardly through the framework of the core to the open top 68 of the riser 64, this being the path of least resistance for the fluid. The fluid will percolate upwardly through the vertical flow portion 58 and ultimately enter the top horizontal flow portion 54. Once the fluid enters this area of the core 22, then the path of least resistance to the tube riser 64 is horizontally directly toward the open top 68 of the riser 64. The water flows into the riser and from there, is forced through the fluid outlet 36 to the filter discharge.

The particular structure of the framework of the core 22 can be easily understood by reference to FIGS. 2–7. As noted above, the core 22 is molded in a substantially planar configuration and is preferably articulated to a non-planar configuration for use. The primary mechanism accommodating the articulation of the framework of the core are a plurality of living hinges 74 provided intermittently through the entirety of the framework. Preferably, the hinges 74 are aligned in vertical rows 76 which, in the preferred embodiment, allow the planar core 22 to be articulated into a cylindrical configuration (FIG. 10). The hinges comprise a thin-walled section of the core 22, the thickness of which is determined by the particular molding material utilized for the core 22 and the desired final configuration of the articulated core. By way of example, the preferred embodiment of the articulated core is molded from polypropylene and the living hinges have a thickness of approximately 0.060" which easily accommodates a cylindrical core having diameter of 21 inches.

A plurality of barbs 78 are provided along the first side edge 50 of the framework and a complementary plurality of slots 80 are provided along the opposite edge 52. As seen in FIG. 10, the barbs 78 are adapted to be received in the slots 80 and retain the core 22 in the cylindrical configuration.

Figure 2A:
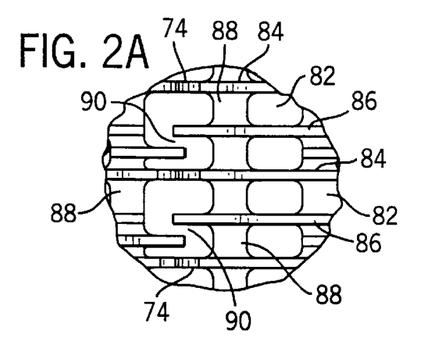
FIG. 2A is a detailed view of the horizontal flow portion of the articulated core as seen in FIG. 2.
Figure 7:
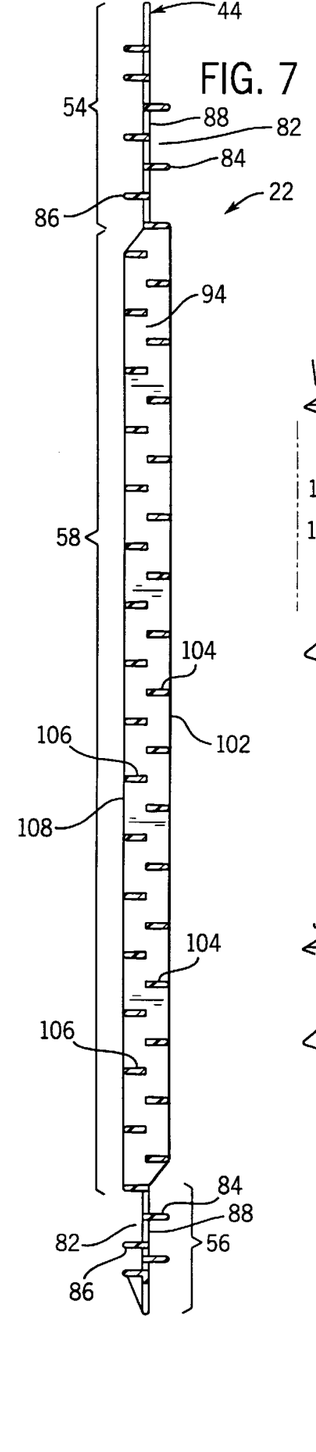
FIG. 7 is a cross-sectional view of the articulated core taken along lines 7—7 of FIG. 2.

The grid configuration of the top and bottom horizontal flow portions 54, 56 are substantially identical and therefore the framework of only the top portion 54 will be described with any specificity. As noted previously, the fluid flow path of least resistance through the flow portion 54 is horizontally as seen in FIGS. 2, 2A and 7. A plurality of horizontally extending fluid channels 82 extend from the side edges 50, 52 toward the central portion of the main body 44. Each of the horizontal channels 82 is defined by an intermittent top wall 84, intermittent bottom wall 86 and a plurality of ribs 88 spaced periodically between the top and bottom walls 84, 86. As seen more clearly in FIG. 7, the top and bottom walls 84, 86 extend only a portion of the thickness of the core 22. The adjacent horizontally extending channels 82 are fluidly connected to one another by a fluid flow path 90 created immediately adjacent the hinges 74. Even though the adjacent horizontally extending channels 82 are fluidly connected via the vertical flow path 90, the path of least resistance for the fluid through this portion 54 of the core 22 is horizontally through the horizontally extending channels 82.

As seen in FIGS. 2, 2B, 4, 5 and 7, the framework of the vertical flow portion 58 of the core 22 comprises vertically extending channels 94 defined by a first side wall 96, a second side wall 98, and an interconnecting horizontal web 100. The side walls 96, 98 extend substantially the full thickness of the core 22 whereas the horizontal web 100 is purposely less than the thickness of the core so that water can flow vertically through the channel 94. In the preferred embodiment, a first series of the plurality of webs 104 extends from the outside surface 102 of the core 22 inwardly only a portion of the thickness of the core and a second plurality of webs 106 extends outwardly from the inside surface 108 of the core for only a portion of the core thickness. Preferably, the first and second series of webs alternate to create a stepped configuration in the vertical flow portion 58 extending between the top and bottom horizontal flow portions 54, 56.

Figure 2B:
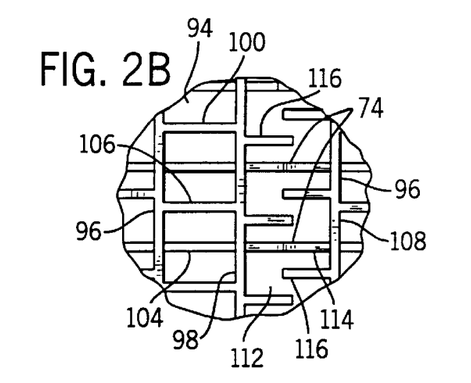
FIG. 2B is a detailed view of the vertical flow portion of the articulated core of FIG. 2.
Figures 3, 4:
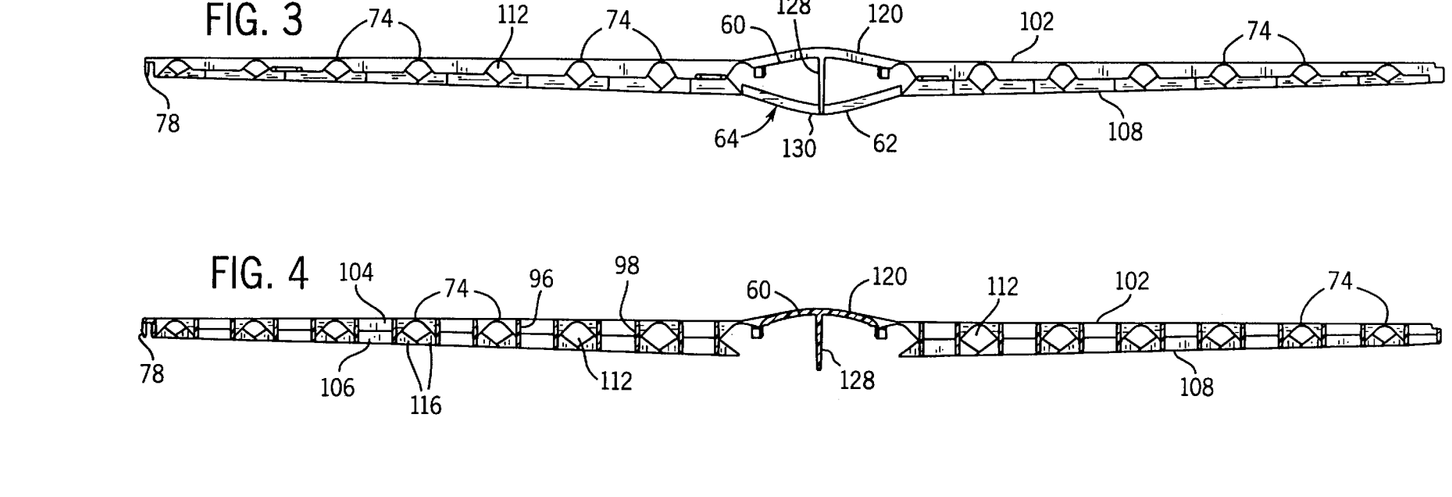
FIG. 3 is a top elevational view of the articulated core in its planar state.
FIG. 4 is a sectional view of the articulated core element taken along lines 4—4 of FIG. 2.
Figure 5:
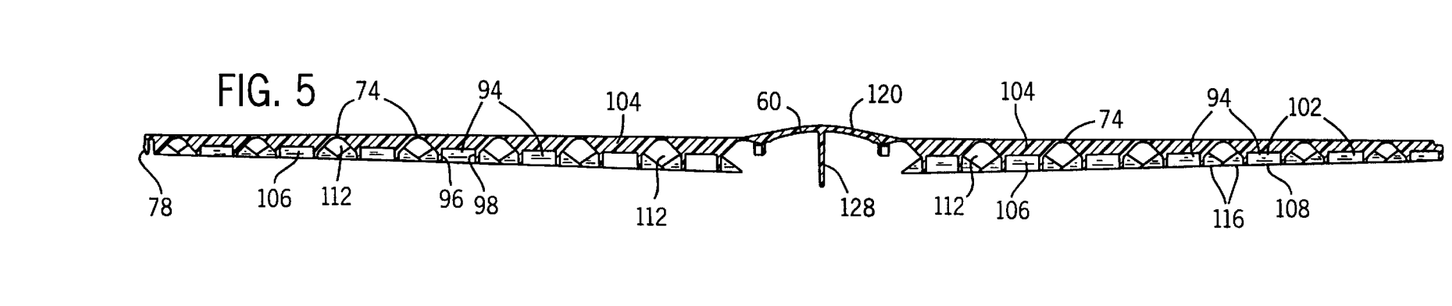
FIG. 5 is a sectional view of the articulated core element taken along lines 5—5 of FIG. 2.

The vertical flow portion 58 also comprises a second series of vertically extending channels 112 defined by the sidewalls 96, 98 of the adjacent first series of vertically extending channels 94. The horizontal webs 114 extending between the sidewalls in this series of channels includes the rows 76 of living hinges 74. In addition, a plurality of baffles 116 extend inwardly a short distance into the channel 112 to create yet another stepped configuration. For both the first and second series of vertically extending channels 94, 112, the fluid flow path of least resistance is vertically.

Figure 6A:
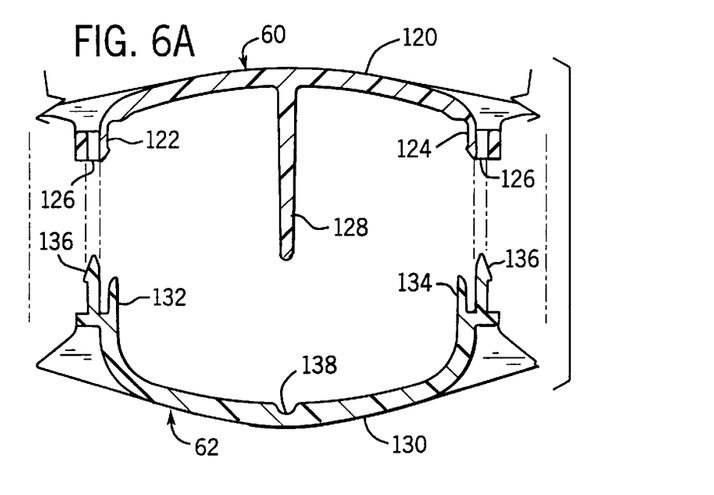
FIG. 6A is a partial-sectional exploded view of the tube riser of the articulated core of FIG. 2.
Figure 6B:
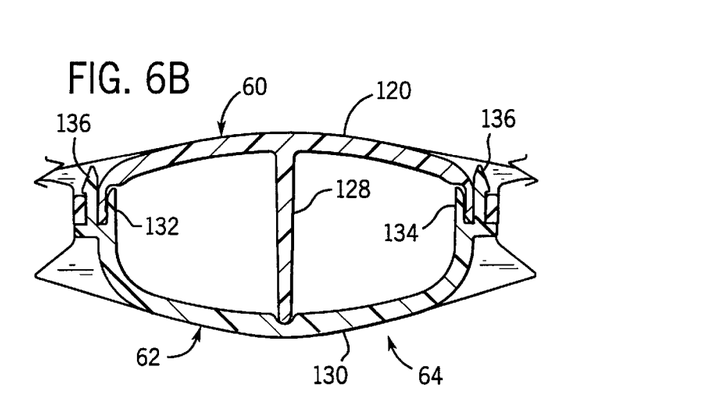
FIG. 6B shows the structure depicted in FIG. 6A in the assembled state.

Another particular feature of the structure of the main body portion 44 of the core 22 is the tube riser 64. As noted previously, the riser is formed from the first half 60 which is integrally molded with the main body portion 44 and a second half 62 which is securely mounted thereto. As seen in FIGS. 6A and 6B, the first half 60 of the riser comprises an arcuate wall 120 and a pair of opposed sidewalls 122, 124. A plurality of slots 126 are provided intermittently along the length of the sidewalls 122, 124 and a supporting rib 128 projects from the arcuate sidewall 120.

The second half 62 of the riser comprises an arcuate wall 130 and a pair of opposed sidewalls 132, 134. A plurality of barbs 136 are provided intermittently along the length of the second half 62 and are adapted to be received within the slots 126 of the first half 60 thereby retaining the riser 64 in its assembled state. The arcuate wall 120 of the second half 62 of the riser incorporates a small depression or channel 138 which is dimensioned to receive the tip of the rib 128 of the first half 60. The channel 138 acts as a support to prevent inadvertent deflection of the rib 128 within the riser 64. As mentioned above, the riser acts as the primary fluid flowpath from the horizontal and vertical portions of the articulated core 22 to the fluid outlet 36. The open bottom of the riser 64 is the sole fluid flow conduit interconnecting the filter cartridge 16 and the fluid outlet 36 of the filter assembly 12 so that all of the filtered water must flow therethrough.

A final feature of the main body portion 44 of the core 22 are a plurality of alignment tabs 142, 144 provided along the top and bottom edges 46, 48, respectively, of the core 22. The tabs 142, 144 are received in corresponding apertures (not shown) provided in the top and bottom caps 28, 30 in order to assure proper alignment of the core 22 and the caps 28, 30.

One feature of the structure of the main body portion 44 of the core which is easily observed in FIGS. 1 and 3–5 is the contoured thickness of the core. The core 22 is thinner adjacent the side edges 50, 52 than it is in the central portion of the core adjacent the tube riser 64. This varying thickness is a function of the fluid flow through the core. When the core is assembled in the cylindrical shape, the fluid is collected and drained therefrom through the tube riser. Therefore, the fluid flow requirements adjacent the riser are greater than the portions of the filter distant from the riser. In recognition of these different fluid flow characteristics, the thickness of the core is tapered accordingly.

Figure 8:
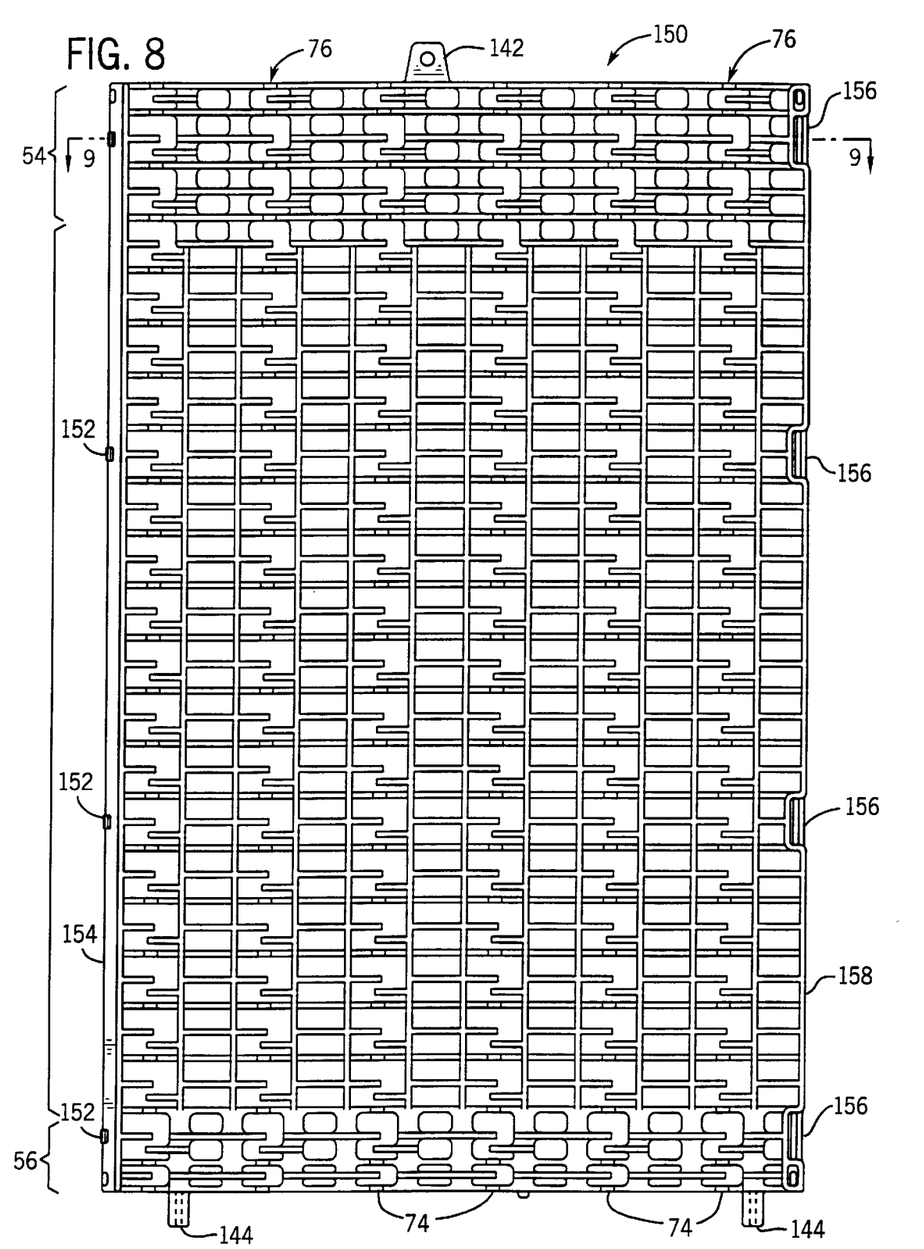
FIG. 8 is a front plan view of a supplemental body portion of the articulated core according to the invention.
Figure 9:
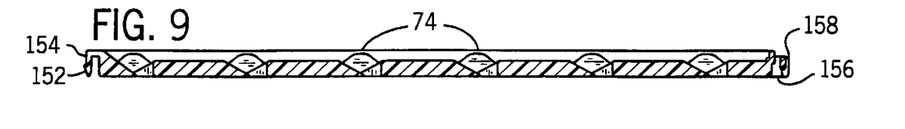
FIG. 9 is a cross-sectional view of the supplemental body portion taken along lines 9—9 of FIG. 8.

The main body portion 44 of the core 22 seen in FIG. 2 is ideally suited in the preferred embodiment for creating a cylindrical filter having a diameter of 21 inches. However, the particular filter capacity needed for a particular application may require a core having a diameter greater than 21 inches. The articulated core according to the invention is also adaptable to different applications in that the diameter of the core can be increased by adding one or more supplemental core body portions 150. As seen in FIGS. 8 and 9, a supplemental core body portion 150 is substantially similar to the main body portion 44 of the core in that it includes the rows of living hinges 76, the alignment tabs 142, 144 and the various horizontal and vertical flow portions 54, 56, and 58. The supplemental core body portion 150 further includes a plurality of barbs 152 provided along a side edge 154 of the body and a plurality of slots 156 provided along the opposite side edge 158. The barbs 152 of the supplemental core body are complementary to and adapted to be received in the slots 80 of the main body portion 44. Similarly, the slots 156 of the supplemental core body are adapted to receive the barbs 78 of the main body portion 44. The diameter of the articulated core can be easily increased by merely snap-fitting the supplemental core body 150 between the side edges 50, 52 of the main body 44. The barbs 152 of the supplemental core body 150 are received in the slots 80 of the main body 44. Similarly, the barbs 78 of the main body 44 are received in the corresponding slots 156 of the supplemental core body. In the preferred embodiment, the inclusion of the supplemental core body increases the diameter of the assembled cylindrical articulated core from 21 to 24 inches.

The mold for forming the preferred embodiment of the articulated core is substantially planer and has a simple cavity formed on the surface thereof for the main body 44 of the core 22. Along one edge of the main body 44 of the core 22 is a cavity for the second half 62 of the tube riser 64. Regardless of whether a core for a 21 inch or a 24 inch filter housing is being manufactured, these portions of the mold cavity are always utilized during an injection molding operation. The supplemental core body portion 150 is also formed in the same mold as the main core body but is separately gated. When it is desired to manufacture cores for a 21 inch housing, the gates to the supplemental core body portion of the mold are closed. Conversely, when cores for a 24 inch housing are being manufactured, the gates to the supplemental core body portion are open such that all elements necessary to form the larger articulated core are manufactured in a single injection molding operation. The ability to use a single set of molds for forming more than one size articulated core provides a significant enhancement in reducing manufacturing costs over the previously known core manufacturing methods. The method of manufacturing the articulated core according to the invention provides other significant advantages over the known manufacturing methods in that the cost of manufacturing the molds is reduced dramatically because the articulated core is molded in a substantially planer condition rather than the hemicylindrical, deep molds previously used. Still another advantage is realized after manufacturing the core, specifically storage costs. The articulated cores according to the invention can be manufactured and stored in a flat, planar condition which is more economical than the prior rigid, non-planar cores.

In the preferred embodiments, the core 22 and the filter membrane supported thereon are cylindrical in shape. However, a variety of non-planar configurations can be utilized depending upon the particular configuration of the filter housing 14 and particular filtration needs. Similarly, the preferred embodiment utilizes two mutually exclusive filter membranes. Once again, the articulated core according to the invention can be utilized with only one filter membrane or more than one membrane depending upon the particular filtration needs and configuration.

Reasonable variation and modification are possible within the spirit of the foregoing specification and drawings without departing from the scope of the invention.

Having thus described the invention, what is claimed is:

1. A fluid filter assembly adapted to be received in a fluid filter system, the fluid filter assembly comprising:
   at least one filter membrane adapted to permit the flow of fluid therethrough; and
   a filter core element adapted to support the at least one filter membrane, the core element comprising:
   top, bottom and opposed side edges;
   a flexible framework extending between the top, bottom and opposed side edges;
   a plurality of hinge elements adapted to accommodate manipulation of the framework between a substantially planar state and a non-planar state; and
   a plurality of fluid flow paths integrally formed therein to direct the flow of fluid therethrough.

2. A fluid filter assembly according to claim 1 wherein the core element is molded from a thermoplastic material and the hinge elements are integrally formed therein.

3. A fluid filter assembly according to claim 2 wherein the hinge elements comprise living hinges.

4. A fluid filter assembly according to claim 1 and further comprising at least one barb provided along one of said opposed side edges and at least one corresponding recess provided along the other of said opposed side edges, the at least one barb and recess cooperating with one another to retain the filter core element in the non-planar state.

5. A fluid filter assembly according to claim 4 wherein the non-planar state in which the framework is retained is cylindrical.

6. A fluid filter assembly according to claim 4 and further comprising a supplemental filter core element adapted to support at least a portion of the at least one filter membrane, the supplemental core element comprising:
   top, bottom and opposed side edges;
   a flexible framework extending between the top, bottom and opposed side edges;
   a plurality of hinge elements adapted to accommodate manipulation of the framework between a substantially planar state and a non-planar state;
   a plurality of fluid flow paths integrally formed therein to direct the flow of fluid therethrough; and
   at least one barb provided along one of said opposed side edges of the supplemental filter core element and at least one corresponding recess provided along the other of said opposed side edges, the at least one barb of the supplemental filter core element being adapted to be received in the recess of the filter core element and the at least one recess of the supplemental filter core element being adapted to receive at least one of the barbs of the filter core element so that the filter core element and supplemental filter core element are mounted to one another in a non-planar state.

7. A fluid filter assembly according to claim 1 wherein at least a portion of the fluid flow paths comprise horizontal flow paths.

8. A fluid filter assembly according to claim 7 wherein at least a portion of the fluid flow paths comprise vertical flow paths.

9. A fluid filter assembly according to claim 8 wherein the a portion of the horizontal flow paths are provided adjacent the bottom edge and a portion of the flow paths are provided adjacent the top edge.

10. A fluid filter assembly according to claim 9 wherein at least a portion of the vertical flow paths are provided intermediate the horizontal flow paths adjacent the top and bottom edges.

11. A fluid filter assembly according to claim 10 wherein the horizontal and vertical flow paths are fluidly connected to one another.

12. A fluid filter assembly according to claim 11 and further comprising a collection fluid flow path adapted fluidly connected to the horizontal flow path adjacent the top edge of the framework, the collection fluid flow path being adapted to be fluidly connected to a fluid outlet of a fluid filter system.

13. A fluid filter assembly according to claim 12 wherein the collection fluid flow path is fluidly connected to the horizontal flow path adjacent the bottom edge of the framework.

14. A fluid filter assembly according to claim 1 wherein the non-planar configuration of the filter core element is cylindrical and the at least one filter membrane is provided on an outside surface of the filter core element.

15. A fluid filter assembly according to claim 14 and further comprising a second filter membrane provided on an inside surface of the filter core element.

16. A core element adapted to support at least one filter membrane of a fluid filter assembly, the core element comprising:
   a flexible framework having a plurality of living hinges adapted to permit articulation of the core element between a substantially planar and non-planar configuration;
   a plurality of flow channels integrated into the framework adapted to create a horizontal fluid flow path of least resistance; and
   a plurality of flow channels integrated into the framework adapted to create a vertical fluid flow path of least resistance.

17. A core element according to claim 16 wherein the flexible framework further comprises top, bottom and opposed side edges and at least a portion of the horizontal flow channels are provided adjacent the top edge.

18. A core element according to claim 17 wherein at least a portion of the vertical flow channels are provided intermediate bottom edge and the horizontal flow channels adjacent the top edge.

19. A core element according to claim 16 and further comprising a collection fluid flow path, the collection fluid flow path being fluidly connected to the vertical flow channels.

20. A core element according to claim 19 wherein the flexible framework further comprises top, bottom and opposed side edges and the collection fluid flow path is provided intermediate the opposed side edges and extends upwardly from the bottom edge.

21. A core element according to claim 20 wherein the core element has a thickness, the thickness varying between the opposed side edges and the collection fluid flow path.

22. A core element according to claim 21 wherein the thickness of the core element is greatest at the collection fluid flow path and the thickness is reduced at the furthest point from the collection fluid flow path.

23. A pool water fluid filter comprising:
   a filter housing having a fluid inlet, a fluid outlet and a hollow interior fluidly connected to both the fluid inlet and outlet; and
   a water filter assembly comprising:
      at least one filter membrane adapted to permit the flow of pool water therethrough; and
      a filter core element adapted to support the at least one filter membrane, the core element comprising:
         top, bottom and opposed side edges;
         a flexible framework extending between the top, bottom and opposed side edges;
         a plurality of hinge elements adapted to accommodate manipulation of the framework between a substantially planar state and a non-planar state;
         a plurality of horizontal fluid flow paths integrally formed therein to direct the flow of fluid substantially horizontally therethrough;
         a plurality of vertical fluid flow paths integrally formed therein to direct the flow of fluid substantially vertically therethrough; and
         a collection fluid flow path provided therein to collect the fluid flowing through the horizontal and vertical flow paths and convey the collected fluid to the fluid outlet of the filter housing.

* * * * *

UNITED STATES PATENT AND TRADEMARK OFFICE
CERTIFICATE OF CORRECTION

PATENT NO. : 6,036,853
DATED : Mar. 14, 2000
INVENTOR(S) : Terrel F. Spencer

It is certified that error appears in the above-identified patent and that said Letters Patent is hereby corrected as shown below:

Add Assignee to read, Sta-Rite Industries, Inc., Delavan, Wis.

Signed and Sealed this

Twenty-fourth Day of April, 2001

*Attest:*

NICHOLAS P. GODICI

*Attesting Officer*     *Acting Director of the United States Patent and Trademark Office*